(12) United States Patent
Yuyama et al.

(10) Patent No.: US 7,603,197 B2
(45) Date of Patent: Oct. 13, 2009

(54) MEDICINE PACKING APPARATUS

(75) Inventors: Hiroyuki Yuyama, Toyonaka (JP);
Hirohisa Shimizu, Toyonaka (JP);
Nobuyuki Shimizu, legal representative, Minoo (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 0 days.

(21) Appl. No.: 10/105,233

(22) Filed: Mar. 26, 2002

(65) Prior Publication Data

US 2002/0143429 A1    Oct. 3, 2002

(30) Foreign Application Priority Data

Mar. 27, 2001    (JP) .............................. 2001-089865

(51) Int. Cl.
*G06F 7/00*    (2006.01)
*G08B 26/00*    (2006.01)

(52) U.S. Cl. .......................... 700/216; 340/505; 705/28
(58) Field of Classification Search .................... 705/28
See application file for complete search history.

(56) References Cited

U.S. PATENT DOCUMENTS

| | | | | |
|---|---|---|---|---|
| 5,460,294 A | * | 10/1995 | Williams | 221/2 |
| 5,502,944 A | * | 4/1996 | Kraft | 53/55 |
| 5,537,313 A | * | 7/1996 | Perelli | 364/403 |
| 5,593,267 A | * | 1/1997 | McDonald et al. | 414/273 |
| 5,597,995 A | * | 1/1997 | Williams et al. | 235/375 |
| 5,664,856 A | * | 9/1997 | Pacetti | 312/348.3 |
| 5,673,983 A | * | 10/1997 | Carlson | 312/218 |
| 5,745,366 A | * | 4/1998 | Higham et al. | 364/479.12 |
| 5,752,235 A | * | 5/1998 | Kehr et al. | 705/3 |
| 5,771,657 A | * | 6/1998 | Lasher et al. | 53/55 |
| 5,805,456 A | * | 9/1998 | Higham et al. | 700/236 |
| 5,845,264 A | * | 12/1998 | Nellhaus | 705/28 |
| 5,905,653 A | * | 5/1999 | Higham et al. | 364/479.14 |
| 5,907,493 A | * | 5/1999 | Boyer et al. | 700/231 |
| 5,961,036 A | * | 10/1999 | Michael et al. | 232/43.1 |
| 5,992,742 A | * | 11/1999 | Sullivan et al. | 235/462.01 |
| 6,036,812 A | * | 3/2000 | Williams et al. | 156/277 |
| 6,082,544 A | * | 7/2000 | Romick | 206/531 |
| 6,116,461 A | * | 9/2000 | Broadfield et al. | 221/98 |

(Continued)

FOREIGN PATENT DOCUMENTS

JP    H1-14081    3/1989

(Continued)

OTHER PUBLICATIONS

Drug Packing Apparatus 2933837 translation.*

*Primary Examiner*—F. Zeender
*Assistant Examiner*—Mussa Shaawat
(74) *Attorney, Agent, or Firm*—Wenderoth, Lind & Ponack, L.L.P.

(57) ABSTRACT

A medicine packing apparatus having a memory (5) that stores shelf numbers of the respective shelf sections the respective kinds of medicines housed in medicine containers. A control unit (6) allows the memory (5) to store the corresponding relationship between the kind of a medicine housed in the medicine container and the shelf number upon attaching the medicine container to the shelf sections. The control unit (6) erases the corresponding relationship from the memory (5) when the medicine container is detached from the shelf. Thus, it is possible to carry out the operations of attaching, detaching and exchanging medicine containers during a medicine packing operation.

13 Claims, 9 Drawing Sheets

U.S. PATENT DOCUMENTS

| | | | |
|---|---|---|---|
| 6,170,746 B1 * | 1/2001 | Brook et al. | 235/385 |
| 6,202,923 B1 * | 3/2001 | Boyer et al. | 235/375 |
| 6,219,587 B1 * | 4/2001 | Ahlin et al. | 700/233 |
| 6,464,142 B1 * | 10/2002 | Denenberg et al. | 235/462.46 |
| 6,581,798 B2 * | 6/2003 | Liff et al. | 221/13 |
| 6,604,019 B2 * | 8/2003 | Ahlin et al. | 700/231 |
| 6,611,806 B1 * | 8/2003 | Harvey | 705/2 |
| 6,735,497 B2 * | 5/2004 | Wallace et al. | 700/231 |
| 6,963,791 B1 * | 11/2005 | Frederick et al. | 700/244 |

FOREIGN PATENT DOCUMENTS

| | | | |
|---|---|---|---|
| JP | 3-41208 | 6/1991 | |
| JP | 2933837 | 5/1999 | |
| WO | WO 91/17936 | * 11/1991 | 705/28 |

\* cited by examiner

FIG.2

< Medicine master file>

| Medicine number | Medicine code | Medicine name | Unit | Container presence/ absence | Shelf number A | Shelf number B |
|---|---|---|---|---|---|---|
| 01 | Tab.A | Tablet A | T | 1 (Presence) | 01 | 02 |
| 02 | Tab.B | Tablet B | T | 0 (Absence) | | |
| 03 | Cap.C | Capsule C | CAP | 1 (Presence) | 03 | |
| 04 | Cap.D | Capsule D | CAP | 0 (Absence) | | |
| 05 | Tab.E | Tablet E | T | 1 (Presence) | 04 | |
| 06 | Cap.F | Capsule F | CAP | 1 (Presence) | 05 | |
| ⋮ | ⋮ | ⋮ | ⋮ | ⋮ | ⋮ | ⋮ |
| 37 | Tab.G | Tablet G | T | 1 (Presence) | | |
| 38 | Cap.H | Capsule H | CAP | 1 (Presence) | | |
| 39 | Tab.I | Tablet I | T | 1 (Presence) | | |
| ⋮ | ⋮ | ⋮ | ⋮ | ⋮ | ⋮ | ⋮ |

FIG. 4

| <Prescription data input> | | | Date of dispense 2001.01.31 | | |
|---|---|---|---|---|---|
| Patient number | 98038671 | | Medical organization code | 0397 | Osaka Hospital |
| Patient name (Kana characters) | ヤマダ゛ タロウ | | Outpatient /inpatient code | 1 | Outpatient |
| Patient name (Chinese characters) | 山田 太郎 | | Exchange number | 0213 | |
| Sex | 1 | Male | Medical care section code | 01 | Internal medicine |
| Date of birth | 3 Shouwa | 20.05.06 | Doctor code | 0102 | Hanako KAWASAKI |
| Age 055 years 08 months | | | Ward code | | |
| Prescription date | 2001.01.31 | | Ward number | | |
| | | | Prescription division code | 01 | Outpatient prescription |

| Prescrip-tion No. | Code | Medicine name /application | Dose/ number of days | Dose divided based upon application times (after getting up, morning, noon, evening, before going to bed, night, 7, 8) |
|---|---|---|---|---|
| 1 | Tab. A | Tablet A | 3 T | 0 1 1 1 0 0 0 0 |
| | Tab. E | Tablet E | 3 T | 0 1 1 1 0 0 0 0 |
| | Cap. H | Capsule H | 3 CAP | 0 1 1 1 0 0 0 0 |
| | /301 | After breakfast, lunch and dinner | 3 days' dose | |

| Medicine container attaching/detaching | Input OK | Cancel | Termination |
|---|---|---|---|

*FIG. 5*

| | | | <Medicine container attaching/detaching process> | | | | | | |
|---|---|---|---|---|---|---|---|---|---|
| Shelf number | | | | | | | | Medicine (attachable) | |

| 1 | 2 | 3 | 4 | 5 | 6 | 7 | 8 |
|---|---|---|---|---|---|---|---|
| O | O | O | O | O | O | O | O |
| 9 | 10 | 11 | 12 | 13 | 14 | 15 | 16 |
| O | O | O | O | O | O | O | O |
| 17 | 18 | 19 | 20 | 21 | 22 | 23 | 24 |
| O | O | O | O | O | O | O | O |
| 25 | 26 | 27 | 28 | 29 | 30 | 31 | 32 |
| O | O | O | O | O | O | | |

Tablet G
Capsule H
Tablet I ( O : Detachable   × : Non-detachable )

| Shelf number | Detached medicine | Attached medicine |
|---|---|---|
| | | |

OK    Cancel

FIG.6

| Shelf number | Detached medicine | Attached medicine |
|---|---|---|
| 01 | Tablet A | |
| 32 | | Tablet G |
| 05 | Capsule F | Tablet I |

FIG. 7

<Medicine container attaching/detaching process>

Shelf number

| 1 | 2 | 3 | 4 | 5 | 6 | 7 | 8 |
|---|---|---|---|---|---|---|---|
|   | × | ○ | × | ○ | ○ | ○ | ○ |
| 9 | 10 | 11 | 12 | 13 | 14 | 15 | 16 |
| ○ | ○ | ○ | ○ | ○ | ○ | ○ | ○ |
| 17 | 18 | 19 | 20 | 21 | 22 | 23 | 24 |
| ○ | ○ | ○ | ○ | ○ | ○ | ○ | ○ |
| 25 | 26 | 27 | 28 | 29 | 30 | 31 | 32 |
| ○ | ○ | ○ | ○ | ○ | ○ |   | ○ |

( ○ : Detachable   × : Non-detachable )

Medicine (required to be attached)

Capsule H

| Shelf number | Detached medicine | Attached medicine |
|---|---|---|
| 03 | Capsule C | Capsule H |

OK    Cancel

MEDICINE PACKING APPARATUS

BACKGROUND OF THE INVENTION

1. Field of the Invention

The present invention relates to a medicine packing apparatus which separately supplies a medicine required for each application time, and packs it with packing paper, such as a tablet packing apparatus and a powdered medicine packing apparatus used in medical facilities such as hospitals and pharmacies, and more particularly concerns a medicine packing apparatus having which functions to attach and detach medicine containers housing medicines, such as tablets and capsules, to and from a shelf section on a medicine supplying shelf.

2. Description of the Background Art

Conventional medicine packing apparatus has been known in which medicines are classified based upon the kinds, and housed in medicine containers, and each of the medicine containers is attached to any one of a plurality of shelves. In the medicine packing apparatus of this type, based upon the shelf number applied to each shelf, a required medicine is supplied from the corresponding medicine container, and packed.

For example, Japanese Examined Patent Publication No. 1-14081 discloses a medicine automatic packing apparatus in which codes are assigned to respective medicine containers, and through a key operation on an operation apparatus, a desired medicine container placed in a predetermined position can be selected.

Japanese Examined Patent Publication No. 3-41208 discloses a tablet supplying apparatus in which, based upon positional information in accordance with identifying information of each tablet feeder, a required tablet feeder is specified, and the corresponding tablet is supplied.

Japanese Patent No. 2933837 discloses a medicine packing apparatus in which, upon attaching a medicine container, medicine data is read and the attached place is stored, so that, based upon the attached place data of each medicine, a desired medicine is supplied and packed.

However, in the above-mentioned conventional medicine packing apparatuses, consideration has not been sufficiently given to the operability at the time of exchanging medicine containers. In other words, although information of each medicine itself is important, the shelf numbers for the respective medicines are changed by using a maintenance screen; therefore, it is impossible to directly change the medicine corresponding to each shelf number. In an actual case, a pharmacist, that is, the operator needs to know the corresponding relationship between each shelf number and the corresponding medicine, and this imposes serious loads on the operator. Moreover, the operation of the maintenance screen is complicated, and tends to cause input mistakes, with the result that it is difficult for the pharmacist to operate it during a medicine packing process. Further, it is also difficult for the pharmacist to confirm the operations of attaching and detaching a medicine container to and from the corresponding shelf section. For this reason, there has been a demand for a system for detecting the presence or absence of a medicine container on a shelf section and for displaying the shelf section to which a medicine is attached or the shelf section from which a medicine is detached.

In particular, in the case of a small-size medicine packing apparatus, since there are few shelf sections of medicine supplying shelves and since the medicine containers are small, the exchange of medicine containers is frequently carried out, causing a higher probability of attaching mistakes of medicine containers to the shelf sections.

SUMMARY OF THE INVENTION

Accordingly, an object of the present invention is to provide a medicine packing apparatus which makes it possible to carry out the operations of attaching, detaching and exchanging medicine containers during a medicine packing operation.

In order to achieve the above-mentioned object, a medicine packing apparatus of the present invention, in which medicine containers housing medicines are classified into respective kinds and are attached to a plurality of shelf sections so as to supply and pack the corresponding medicine from the corresponding medicine container of the shelf section, includes: a storing unit for storing shelf numbers of the respective shelf sections and the respective kinds of medicines housed in the medicine containers; and a control unit for allowing the storage unit to store the corresponding relationship between the kind of a medicine housed in the medicine container and the shelf number upon attaching the medicine container to the shelf sections, and for erasing the corresponding relationship from the storage unit upon detaching the medicine container from the shelf.

With this arrangement, by only attaching and detaching medicine containers to and from the respective shelf sections, the shelf numbers and the corresponding kinds of medicines are shown in parallel with each other. Therefore, it becomes possible to carry out the operations of attaching, detaching and exchanging medicine containers during a medicine packing operation. For this reason, even when the kinds of medicines become more than the number of the shelf sections, it is possible to deal with such cases by exchanging the medicine containers during a packing process.

Moreover, when a display unit which displays the corresponding relationship between the shelf number of the shelf section to which the medicine container is attached and the medicine placed therein or the corresponding relationship between the shelf number of the shelf section from which the medicine container is detached and the medicine detached therefrom, is added to this apparatus, it becomes possible to confirm the operations of attaching and detaching the medicine containers to and from the respective shelf section, and this arrangement makes it possible to prevent the operator from being confused even when the number of attaching and detaching operations increases.

In this arrangement, when the display unit is allowed to display shelf numbers of the shelf sections to which medicine containers containing medicines included in prescription data are attached and shelf numbers of the shelf sections to which the other medicine containers that contain no medicines included in the prescription data are attached, shelf sections in which medicine containers are easily exchangeable are readily specified so that it becomes possible to improve the operability.

In the case when a medicine container detecting unit, which detects the presence or absence of a medicine container on the shelf section, is further added to this arrangement, based upon a detection signal from the medicine container detecting unit, the control unit allows the display unit to display the shelf number of the shelf section to which the medicine container is attached or the shelf number of the shelf section from which the medicine container is detached. Thus, it becomes possible to automatically detect the attaching and detaching operations of the medicine containers, and consequently to improve the operability while preventing erroneous attaching operations.

In the case when a medicine identifying information reading unit, which reads medicine identifying information of a medicine container on a shelf section, is further added to this arrangement, based upon a detection signal from the medicine identifying information reading unit, the control unit allows the display unit to display the medicine and the shelf number of the corresponding shelf section. Thus, it becomes possible to automatically identify the kinds of medicines, and consequently to further improve the operability.

BRIEF DESCRIPTION OF THE DRAWINGS

Other objects and features of the present invention will become clear from the following detail description with reference to the accompanying drawings in which:

FIG. 2 is a graph showing the contents of storage in a medicine master file;

FIG. 4 shows a screen of "prescription data input";

FIG. 5 shows a screen of "medicine container attaching/detaching" process;

FIG. 6 shows a display of shelf numbers, detached medicines and attached medicines;

FIG. 7 shows a screen of "medicine container attaching/detaching" process carried out based upon prescription data;

DESCRIPTION OF THE PREFERRED EMBODIMENTS

Figure 1:
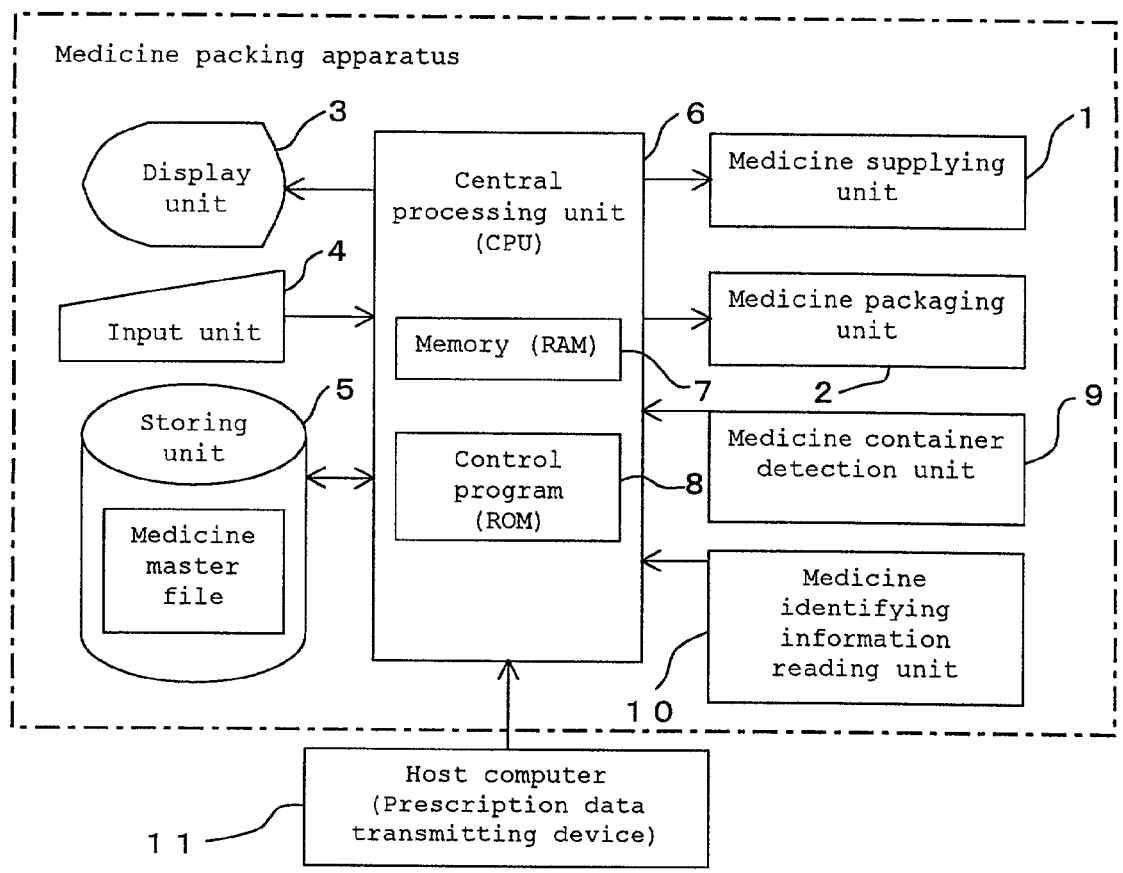
FIG. 1 is a block diagram showing a configuration of a medicine packing apparatus.

FIG. 1 shows a medicine packing apparatus in accordance with the first embodiment of the present invention. This medicine packing apparatus is provided with a medicine supplying unit 1, a medicine packaging unit 2, a display unit 3 such as a liquid crystal display or a CRT display, an input unit 4 such as a key board mouse or a touch panel, and a storing unit 5 such as a hard disk or a flash memory, and the medicine packing apparatus as a whole is controlled by a central processing unit (CPU) 6. Here, reference number 11 represents a host computer.

The medicine supplying unit 1 is provided with a number of medicine containers for housing medicines such as tablets and capsules and a medicine supplying shelf having a number of shelf sections to and from which the medicine containers are freely attached and detached. Moreover, a manual medicine supplying unit (not shown) used for supplying medicines without medicine containers is also prepared. The medicine supplying shelf selects a specified number of medicines from the medicine containers attached to shelf sections corresponding to the medicines that have been specified so as to be packed for each application time and supplied to the medicine packing apparatus 2. Here, the medicine supplying shelf may be formed into various shapes such as a plane shape and a cylinder shape.

The medicine packaging unit 2 drops medicines supplied based upon each application time from a medicine shoot onto packing paper (packing sheet) having a thermal fusing property that is drawn from a packing paper roll, and thermally fuses and seals the lateral and longitudinal portions of the packing paper to successively form packed bags containing the medicines.

The display unit 3 and the input unit 4 are used for operation inputs to the entire medicine packing apparatus, input operations for prescription data and data inputs for various master files such as medicine master files.

The display unit 3 displays a prescription data input screen and a medicine container attaching and detaching screen.

As shown in FIG. 4, the prescription data input screen displays the present date counted by a calendar clock installed in the central processing unit (CPU) 6 as the medicine preparation date. Desired prescription data are inputted to frames below the patient number by the operator (pharmacist). For example, when key board inputs are given as the patient number "98038671", the corresponding patient name (Kana characters, Chinese characters), sex (male=1, female=2) and date of birth (name of era: Meiji=1, Taisho=2, Showa=3, Heisei=4) are read from the patient master file, and displayed. With respect to the age, the corresponding age is displayed by calculating from the present date and the date of birth. The date on which the prescription is issued by the doctor is displayed as the prescription date. Although the present date is displayed at first, any desired date can be overwritten and inputted. When respective codes are inputted to the medical organization, medical care section, doctor, ward and prescription frames, the respective name data are read from the various corresponding master files, and displayed. For example, "01" is inputted as the medical care section code, "internal medicine" is displayed. Outpatient/inpatient code (outpatient=1, inpatient=2) is a classifying code for patients. Exchange number is the number of "medicine exchanging card" that is passed to only the outpatients upon completion of the accounting process. Since this example shows an outpatient prescription, the inpatient-use ward code and ward number are left blank.

A serial number of "prescription" in which not less than one medicines and the applications are combined is inputted to the frame "prescription No.". With respect to the "prescription", a plurality of them can be inputted. Then, the medicines are packed basically on the basis of "prescription", that is, on the basis of prescription No. data. "Code" frames are frames used for inputting medicine codes or application codes. When these codes are inputted, name data are read from the medicine master file or the application master file and displayed. Although "code" frames are normally used for inputting a medicine code (for example, "Tab. A"), when the "/" symbol is inputted at the head of the frame, an application code can be inputted on the following portion (for example, "301"). Here, the medicine name corresponding to the medicine code and the application name corresponding to the application code "301", that is, "after breakfast, lunch and dinner" are displayed. With respect to the "dose/days" frame, a daily dose of the medicine is inputted in the medicine line on which the medicine code has been inputted. Units (T, CAP, g, etc.) are read out from the medicine master file, and displayed. Here, in the application line in which the application code has been inputted, the number of days is inputted (for example, "three days' dose"). With respect to "application time divided dose" frame, a divided dose, obtained by dividing the dose (daily dose) based upon respective application times (after getting up, in the morning, at noon, in the evening, before going to bed, night time, seventh time, eighth time), is inputted.

With respect to the prescription data, in addition to inputting them through the keyboard mouse, they can be received from the host computer 11. The prescription data thus received are written in the memory 7, and displayed on the screen so as to be desirably overwritten and inputted. If, after monitoring the contents of the prescription data, the operator (pharmacist) finds no problem, he or she clicks the "input OK" button through the mouse. Then, the sequence proceeds to the next processing step "shelf state and display of required medicines to be attached". When the "cancel" button is clicked through the mouse, the displayed prescription data are erased. When the "termination" button is clicked through the mouse, "prescription data input" screen (FIG. 4) is completed to return to the menu screen; thus, the medicine packing process (FIG. 3) is completed. When the "medicine container attaching/detaching" button is clicked through the mouse, the operation of the "medicine container attaching/detaching" screen (FIG. 5) is activated.

With respect to the medicine container attaching/detaching screen, that which relates to the normal operation based upon only the medicine master data and that which relates to the operation based upon the prescription data are prepared. Here, in the normal operation, when the "medicine container attaching/detaching" button is clicked by the operator through the mouse on the "prescription data input" screen (FIG. 4), the operation of the medicine container attaching/detaching process (FIG. 8: first embodiment, FIG. 9: second embodiment) is activated with the shelf state and attachable medicines being displayed on the "medicine container attaching/detaching" screen (FIG. 5). Moreover, in the operation based upon the prescription data, when the prescription data are inputted, the operation of the medicine container attaching/detaching process (FIG. 8: first embodiment, FIG. 9: second embodiment) is activated with the shelf state and required medicines to be attached being displayed on the "medicine container attaching/detaching" screen (FIG. 7).

As shown in FIG. 5, in the screen corresponding to the normal operation based upon only the medicine master data, the shelf state of the medicine containers is displayed on the "shelf number" frame. In the case when a medicine container is attached to the corresponding shelf section, "○" mark is displayed, and in the case of a detached state, the frame is left blank. In the "medicine" frames, medicine containers are listed with attachable medicines being displayed. In the "shelf number, detached medicine and attached medicine" frame, the relationship between the shelf number and the detached/attached medicine is displayed in the case when the medicine container is detached or in the case when the medicine is attached.

In the screen of FIG. 5, the relationship between the shelf number and the detached/attached medicine is given, for example, as shown in FIG. 6. In other words, in FIG. 6, the shelf number "○" represents an example of the detached state, the shelf number "32" represents an example of the attached state, and the shelf number "05" represents an example of the exchanging state (detaching and attaching states). In the example of the detached state of FIG. 6, the shelf number 1 of FIG. 5 has a "○" mark; therefore, when the operator has detached the medicine container from this shelf section, the shelf number "01" and the detached medicine "tablet A" are displayed in the "shelf number, detached medicine and attached medicine" frame. In the medicine master file (FIG. 2), the shelf number "01", set as the shelf number A in the record of the tablet A, is erased. In the example of the attached state in FIG. 6, when, since the shelf number 32 of FIG. 5 is left blank, the operator attaches a medicine container of tablet G to this shelf section, the shelf number "32" and the attached medicine "tablet G" are displayed in the "shelf number, detached medicine and attached medicine" frame. In the medicine master file (FIG. 2), the shelf number "32" is set as the shelf number A in the record of the tablet G. In the example of the exchanging state (detaching and attaching states) of FIG. 6, when, since the shelf number 5 of FIG. 5 has the "○" mark, the operator detaches the medicine container from this shelf section, the shelf number "05" and the detached medicine "capsule F" are displayed in the "shelf number, detached medicine and attached medicine" frame, and when a medicine container of the tablet I is attached thereto, the attached medicine "tablet I" is displayed therein. In the medicine master file (FIG. 2), the shelf number "05", set as the shelf number A in the record of the capsule F, is erased, and the shelf number "05" is set as the shelf number A in the record of the tablet I.

Moreover, as shown in FIG. 7, in the screen corresponding to the operation based upon the prescription data, the shelf state of the medicine container is displayed in the "shelf number" frame. When a medicine container is attached to a certain shelf section and is detachable, the "○" mark is displayed; however, if this medicine container includes a medicine included in the prescription data, an "X" mark is displayed since this is not detachable. When this shelf section is in the detached state, the frame is left blank. The "medicine" frames display those medicines that are included in the prescription data and need to be attached. The "shelf number, detached medicine and attached medicine" frame displays the relationship between the shelf number and the detached/attached medicine in the case when the medicine container is detached therefrom or in the case when the medicine container is attached thereto. In the example of the exchanging state (detaching and attaching states) of FIG. 7, when, since the shelf number 3 has the "○" mark, the operator detaches the medicine container from this shelf section, the shelf number "03" and the detached medicine "capsule C" are displayed in the "shelf number, detached medicine and attached medicine" frame, and when a medicine container of the capsule H is attached thereto, the attached medicine "capsule H" is displayed therein. In the medicine master file (FIG. 2), the shelf number "03", set as the shelf number A in the record of the capsule C, is erased, and the shelf number "03" is set as the shelf number A in the record of the capsule H.

The central processing unit (CPU) 6 has a built-in memory (RAM) 7 which temporarily stores various data, and this memory 7 is used as a processing data memory for storing prescription data and a processing work memory. Moreover, the central processing unit (CPU) 6 is provided with a control program (ROM) 8 for controlling the entire medicine packing apparatus.

The storing unit 5 stores various data such as medicine master files. Moreover, various data, serving as various masters for storing related information used at the time of inputting the prescription data, include patient master, medical organization master, medical care section master, doctor master, ward master, prescription division master, etc. Since each of these masters has a simple structure for simply storing codes and names, etc., the drawings thereof are omitted.

The data structure of the medicine master file stored in the storing unit 5 is described below. The medicine master file is a data file in which, various data on medicines, required for the operation of the medicine packing apparatus, are registered for each medicine, and FIG. 2 shows the contents of the storage. Here, data for this medicine master file (FIG. 2) are inputted on the screen (not shown since this has the same screen structure as the file structure) of the medicine master registration activated from the menu screen (not shown since this is a simple screen with aligned activation buttons) through the keyboard mouse.

The medicine number shows an identification number for each medicine. The medicine code is an identifying code for each medicine. In this case, for convenience of inputting process for the pharmacist, each code is determined by shortening the abbreviation of a medicine name. For example, tablet A is indicated as "Tab. A" The medicine name is referred to as the title of the medicine. The unit is the title of the unit used for preparing the medicine, and "capsule" is represented by CAP, "tablet" is represented by T, and "gram" is represented by g. The presence or absence of the container represents the presence or absence of a medicine container housing a medicine, and "presence" is indicated by 1, and "absence" is indicated by 0. Only for medicines in the state of "presence", an automatic packing process is available, and medicines in the state of "absence" are packed by using the manual medicine supplying unit 1. The shelf numbers A and B are shelf numbers indicating the shelf sections to which medicine containers are attached. The reason that A and B are prepared is because the maximum two medicine containers housing the same medicine can be attached. In the example shown in FIG. 2, there are two medicine containers including the tablet A, which are attached to the shelf numbers "01" and "02".

The display unit 3, the input unit 4, the central processing unit (CPU) 6 and the storing unit 5 may be formed by a personal computer. Here, not limited to these apparatuses, desired kinds and number of hardware apparatuses may be optionally used.

The host computer 11, which is a apparatus having a function for transmitting processing data, is connected when the medicine packing operation is carried out by utilizing the prescription data contained therein. With respect to this host computer 11, examples thereof include a hospital host for operating a prescription ordering system and a medical accounting system of the hospital and a medical business (recepto) computer in a pharmacy. Here, since the prescription data can be inputted by using only the medicine packing apparatus so that the host computer 11 is not necessarily required. Moreover, it may have a client-server structure in which the storing unit 5 may be provided as an independent server apparatus (built in the CPU) for use in the file/data base, with the display unit 3, the input unit 4 and the central processing apparatus (CPU) 6 being connected by the server apparatus and a network (LAN) as client terminals.

Figure 3:
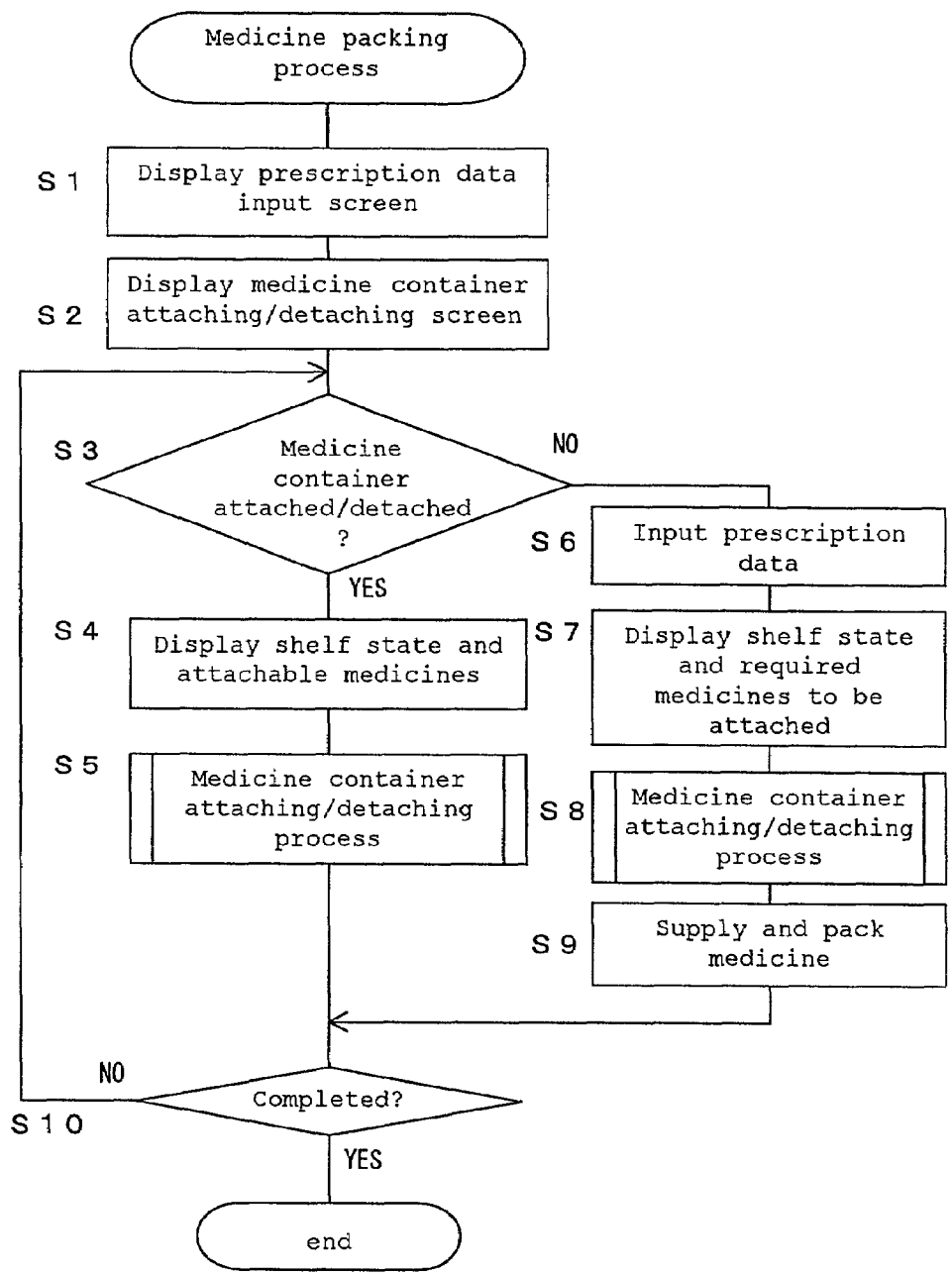
FIG. 3 is a flow chart showing processes of a medicine packing operation.

Then, a medicine packing process carried out by the medicine packing apparatus having the above-mentioned arrangement will be described with reference to a flow chart in FIG. 3.

In the medicine packing process, first, the "prescription data input" screen (FIG. 4) is activated from the menu screen (not shown, since this is a simple screen with aligned activation buttons) so that the initial display is provided with the "patient name" frame and the following display and input frames being left blank (step S1). Moreover, the "medicine container attaching/detaching" screen (FIG. 5) is provided as the initial display with the "shelf number" frame, "medicine" frame and "shelf number and detached medicine and attached medicine" frame being left blank (step S2).

Here, the detached or attached state of a medicine container is determined (step S3). This determination is made depending on whether or not the "medicine container attaching/detaching" button of the "prescription data input" screen (FIG. 4) has been clicked through the mouse by the operator.

When the "medicine container attaching/detaching" button is clicked, this operation is regarded as the normal attaching/detaching operation of the medicine container, and based upon only the medicine master file (FIG. 2), the attached state of the medicine container to the shelf section is displayed on the "shelf number" frame of the "medicine container attaching/detaching" screen (FIG. 5) with attachable medicines being displayed on the "medicine" frames (step S4). With respect to the display of the shelf state, since the record of "presence" in the presence or absence of the container from the medicine master file (FIG. 2) is read and since medicine containers are attached to the shelf numbers set to the shelf numbers A and B, the "O" mark (detachable) is displayed in the frame of the shelf number of FIG. 5. With respect to the display of the attachable medicines, the records under the conditions of "presence" in the presence or absence of the container and no-settings in the shelf numbers A and B are read, and the corresponding medicine names are displayed in the "medicine" frame in FIG. 5. In the example of FIG. 5, since medicine containers have been attached to the shelf numbers 1 to 30, and as shown in FIG. 2, since no-settings are given to the shelf numbers A and B, the tablet G, capsule H and tablet I are attachable medicines. Then, the "medicine container attaching/detaching process" is carried out (step S5).

In contrast, in the case when the "medicine container attaching/detaching" button is not clicked, in the "prescription data input" screen (FIG. 4) with all the data input frames being left blank, prescription data are inputted as shown in the example of the contents of FIG. 4 through the data receipt from the host computer 11 or the keyboard mouse input (step S6). Then, based upon the medicine master file (FIG. 2) and the prescription data (FIG. 4), the attached states of the medicine containers to the shelf sections are displayed on the "shelf number" frames in the "medicine container attaching/detaching" screen (FIG. 7), and required medicines to be attached are displayed on the "medicine" frames (step S7). With respect to the display of the shelf state, since the record of "presence" in the presence or absence of the container from the medicine master file (FIG. 2) is read and since medicine containers are attached to the shelf numbers set to the shelf numbers A and B, the "O" mark (detachable) is displayed in the frame of the shelf number of FIG. 7. However, since the medicine containers of the medicines included in the prescription data (FIG. 4) are not detachable, the "X" mark is displayed in the frame of the corresponding shelf number. With respect to the display of the required medicines to be attached, under the conditions of "presence" in the presence or absence of the container, no-settings in the shelf numbers A and B and medicines included in the prescription data, the records are read, and the corresponding medicine names are displayed in the "medicine" frames in FIG. 7. In the example of FIG. 7 after the detaching or attaching process in FIG. 6, medicine containers are attached to the shelf numbers 2 to 30 and 32. However, since the tablet A (shelf number 02) and the tablet E (shelf number 04) in the prescription data (FIG. 4) have "X" marks, and since the capsule H in the prescription data (FIG. 4) has no-settings in the shelf numbers A and B, these are classified as required medicines to be attached. Successively, after the "medicine container attaching/detaching process" has been carried out (step S8), the medicines are supplied, and packed (step S9).

Thereafter, until the "termination" button of the "prescription data input" screen (FIG. 4) has been clicked through the mouse by the operator, the processes of the above-mentioned steps S3 to S9 are repeated (step S10).

Figure 8:
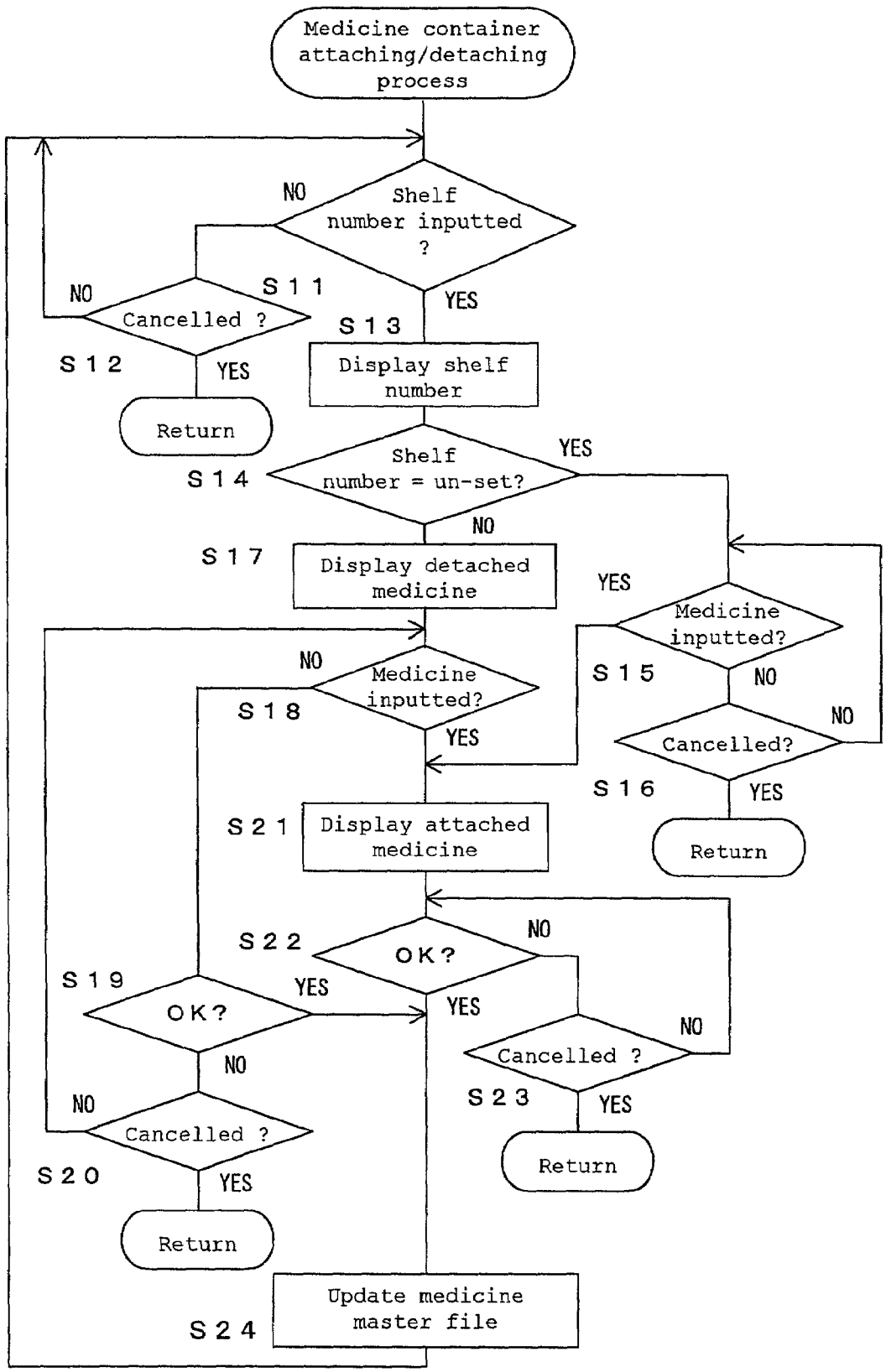
FIG. 8 is a flow chart showing medicine container attaching/detaching processes in accordance with a first embodiment.

Here, as shown in a flow chart in FIG. 8, in the above-mentioned medicine container attaching/detaching process, a determination is first made as to whether or not there has been any input of a shelf number (step S11) This determination is made depending on whether or not any shelf section in the "shelf number" frame of the "medicine container attaching/detaching" screen (FIG. 5) has been clicked by the operator through the mouse.

If none of shelf sections in the "shelf number" frames have been clicked, a determination is made as to whether or not the "cancel" button of the "medicine container attaching/detaching" screen (FIG. 5) has been clicked by the operator through the mouse (step S12). If the "cancel" button has been clicked, the sequence returns to the above-mentioned medicine packing process (FIG. 3). If the "cancel" button is not clicked, the sequence returns to step S11.

In contrast, if any shelf section in the "shelf number" frames, for example, shelf number 1 has been clicked, the corresponding number is highlighted so that the inputted shelf number is displayed on the "shelf number and detached and attached medicine" frame of the "medicine container attaching/detaching" screen (FIG. 5) (step S13). In the example of the detached state of FIG. 6, the shelf number "01" is displayed, in the example of the attached state of FIG. 6, the shelf number "32" is displayed, and in the example of the exchanging states of FIG. 6, the shelf number "05" is displayed.

Here, a determination is made as to whether or not the shelf number is in the un-set state (step S14). In other words, a determination is made as to whether or not the inputted shelf number is in the un-set state in all the records of the master file (FIG. 2). In the case of the un-set state, a determination is made as to whether or not the medicine to be attached is clicked through the mouse by the operator from the list of the attachable medicines displayed on the "medicine" frame in the "medicine container attaching/detaching" screen (FIG. 5) (step S15), and if any medicine has been clicked, the sequence proceeds to step S21, which will be described later. In the example of the attached state of FIG. 6, when "tablet G" of FIG. 5 is clicked, this is highlighted and displayed so that "tablet G" is inputted as the attached medicine, and the sequence proceeds to step S21. Here, in the case when no medicine has been clicked, the "cancel" button of the "medicine container attaching/detaching" screen (FIG. 5) is clicked by the operator through the mouse so that (step S16), the sequence returns to the above-mentioned medicine packing process (FIG. 3). If the cancel button is not clicked, the sequence returns to step S15.

In contrast, if the shelf number has been set in any of the records in the medicine master file, those records having detached shelf numbers in the shelf numbers A and B in the medicine master file (FIG. 2) are retrieved, and the resulting medicine names are displayed as the detached medicines on the "shelf number and detached medicine and attached medicine" frame of the "medicine container attaching/detaching" screen (FIG. 5) (step S17). In the example of the detached state of FIG. 6, the medicine master file is retrieved for the shelf number "01" so that "tablet A" is displayed as the detached medicine. In the example of the exchanging states in FIG. 6, the medicine master file is retrieved for the shelf number "05" so that "capsule F" is displayed as the detached medicine.

Here, a determination is made as to whether or not any medicine has been inputted, that is, whether or not any medicines to be attached are clicked by the operator through the mouse from the list of attachable medicines displayed on the "medicine" frame of the "medicine container attaching/detaching" screen (FIG. 5) (step S18).

If no medicines have been inputted, a determination is made as to whether or not the "OK" button in the "medicine container attaching/detaching" screen (FIG. 5) has been clicked by the operator through the mouse (step S19), and if the "OK" button is not clicked, a determination is made as to whether or not the "cancel" button has been clicked by the operator through the mouse (step S20). If the "cancel" button has been clicked, the sequence returns to the above-mentioned medicine packing process (FIG. 3), and if the button is not clicked, the sequence returns to step S18, and the above-mentioned processes are repeated. Moreover, if the "OK" button has been clicked, the sequence proceeds to step S24.

If any medicines have been inputted, the corresponding medicine names are displayed in the "shelf number, attached medicine and detached medicine" frame in the "medicine container attaching/detaching" screen (FIG. 5) (step S21). In the example of the exchanging states of FIG. 6, when "tablet I" of FIG. 5 has been clicked, this is highlighted so that the "tablet I" to be attached is inputted and "tablet I" is displayed. Moreover, in the example of the attached state of FIG. 6, the "tablet G" is displayed as the attached medicine.

Thereafter, a determination is made as to whether or not the "OK" button of the "medicine container attaching/detaching" screen (FIG. 5) has been clicked by the operator through the mouse (step S22), and if the "OK" button is not clicked, a determination is made as to whether or not the "cancel" button has been clicked by the operator through the mouse (step S23). If the "cancel" button has been clicked, the sequence returns to the above-mentioned medicine packing process (FIG. 3), and if the button is not clicked, the sequence returns to step S22.

If the "OK" button is clicked, the medicine master file is updated (step S24). In other words, if there is any medicine to be detached in the "shelf number and detached medicine and attached medicine" frame (FIG. 6) of the "medicine container attaching/detaching" screen (FIG. 5), the shelf numbers set in the shelf numbers A and B of the records of the medicine to be detached in the medicine master file (FIG. 2) are erased. If there is any medicine to be attached in the "shelf number and detached medicine and attached medicine" frame (FIG. 6) of the "medicine container attaching/detaching" screen (FIG. 5), the shelf number is set in either of the shelf numbers A and B that is vacant of the record of the medicine to be attached in the medicine master file (FIG. 2). In the case of the exchanging states of medicine containers, both of the detaching and attaching processes are carried out. Therefore, the above-mentioned processes are repeated starting from the shelf number input determination of the above-mentioned step S11. In the case of the example of the detached state of FIG. 6, the shelf number "01" set in the shelf number A of the record of the tablet A is erased. In the case of the example of the attached state of FIG. 6, the shelf number "32" is set to the shelf number A of the record of the tablet G. In the case of the example of exchanging (detaching and attaching) states of FIG. 6, the shelf number "05" set as the shelf number A in the record of the capsule F is erased, and the shelf number "05" is set as the shelf number A in the record of the capsule I.

Second Embodiment

The second embodiment is different from the above-mentioned first embodiment in that a medicine container detection unit 9 and a medicine identifying information reading unit 10 are installed. Moreover, this arrangement eliminates the necessity of inputs of the shelf numbers and the medicines by the operator, and as will be described later, the processes of attaching and detaching the medicine container are also different.

The medicine container detection unit 9 and the medicine identifying information reading unit 10 are installed for each of a number of shelf sections placed on the medicine supplying shelves. The medicine container detection unit 9 detects whether or not there is any medicine container in a shelf section. Moreover, the medicine identifying information reading unit 10 reads medicine identifying information for identifying the medicine that is attached to a medicine container placed in a shelf section. The medicine identifying information may be prepared as any information such as medicine numbers and medicine codes, as long as the information makes it possible to identify the medicine. Here, the medicine container detection unit 9 may be provided as any apparatus such as a photoelectric sensor or a micro-switch. Moreover, the medicine identifying information and the reading apparatus may be provided as any forms such as a bar code and a bar-code reader or a binary code formed by aligning positions of magnet pieces and a magnetic sensor placed so as to face the aligning positions.

Figure 9:
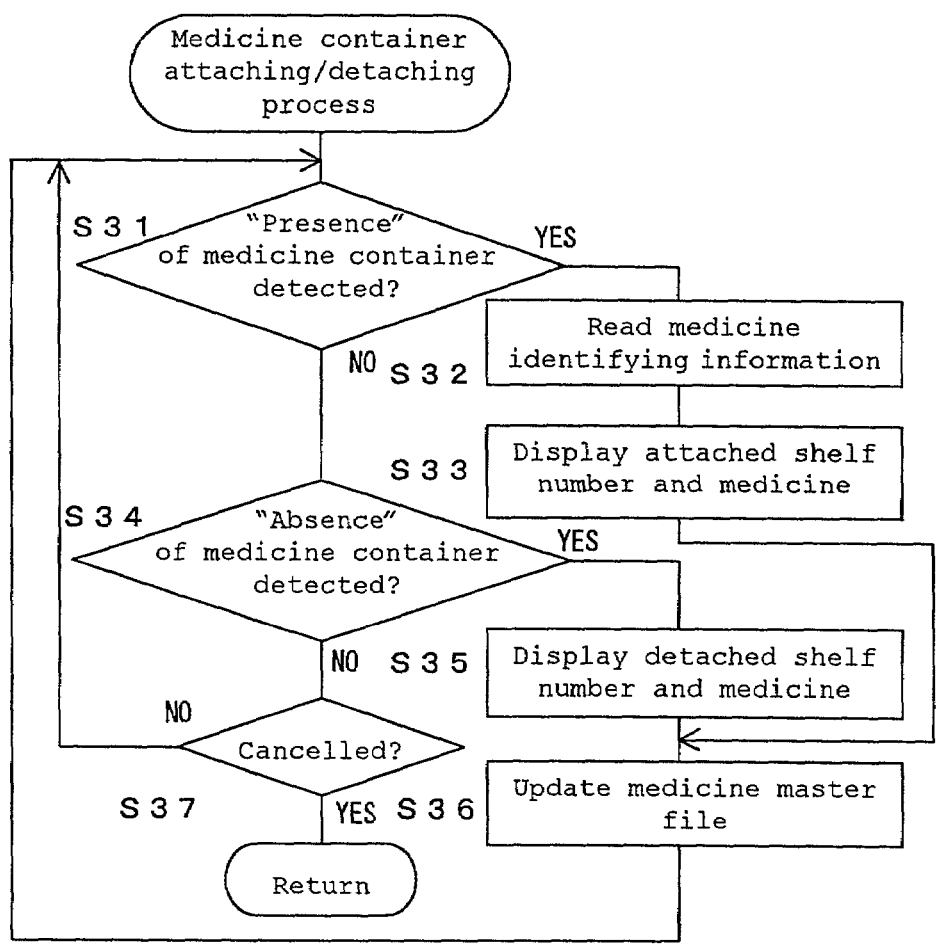
FIG. 9 is a flow chart showing medicine container attaching/detaching processes in accordance with a second embodiment.

In the medicine container attaching and detaching processes of the second embodiment, these processes are called in the medicine packing process (FIG. 3), and as shown in FIG. 9, first, a determination is made as to whether or not "present" of medicine container has been detected (step S31).

If the "present" of medicine container has been newly detected at any shelf section, a shelf number is acquired since this relates to the attaching process, and the medicine identifying information added to the attached medicine container is read (step S32). In the example of the attaching state of FIG. 6, since a medicine container of tablet G is attached to the shelf section of the shelf number 32, the shelf number "32" is acquired, and the medicine identifying information added to the medicine container of tablet G is read. In the example of exchanging states in FIG. 6, when the medicine container of tablet I is attached to the shelf section of the shelf number 5, the shelf number "05" is acquired, and the medicine identifying information added to the medicine container of tablet I is read.

Then, the attached shelf number and medicine are displayed (step S33). In other words, the shelf number to be attached and the name of the medicine to be attached are displayed on the "shelf number and attached medicine and detached medicine" frame of the "medicine container attaching/detaching" screen (FIG. 5). The medicine names are obtained by retrieving the medicine master file (FIG. 2) for medicine identifying information. In the example of the attached state of FIG. 6, the shelf number "32" is displayed and the "tablet G" is displayed as the attached medicine. In the example of the exchanging states of FIG. 6, prior to the attaching process, the detaching process is carried out by using the same shelf number so that the shelf number "05" has already been displayed. Therefore, the "tablet I" is displayed as the attached medicine. Then, the sequence proceeds to step S36.

Moreover, if the "presence" of a medicine container has not been detected, a determination is made as to whether or not the "absence" of a medicine container has been detected (step S34). Then, if the "absence" of medicine container is newly detected at any of the shelf sections, a shelf number is acquired since this relates to the detaching process. In the example of the detaching state of FIG. 6, when a medicine container of tablet A is detached from the shelf section of the shelf number 1, the shelf number "01" is acquired. Moreover, in the example of exchanging states in FIG. 6, when the medicine container of tablet capsule F is detached from the shelf section of the shelf number 5, the shelf number "05" is acquired.

Then, the detached shelf number and medicine are displayed (step S35). In other words, the shelf number to be detached and the name of the medicine to be detached are displayed on the "shelf number and detached medicine and attached medicine" frame of the "medicine container attaching/detaching" screen (FIG. 5). The medicine names are obtained by retrieving the medicine master file for the shelf number to be detached (FIG. 2). In the example of the detached state of FIG. 6, the shelf number "01" is displayed and the "tablet A" is displayed as the detached medicine. In the example of the exchanging states of FIG. 6, the shelf number "05" is displayed and the "capsule F" is displayed as the detached medicine.

Successively, the medicine master file is updated (step S36). In other words, if there is any medicine to be detached in the "shelf number and detached medicine and attached medicine" frame of the "medicine container attaching/detaching" screen (FIG. 5), the shelf numbers set in the shelf numbers A and B of the records of the medicine to be detached in the medicine master file (FIG. 2) are erased. If there is any medicine to be attached in the "shelf number and detached medicine and attached medicine" frame of the "medicine container attaching/detaching" screen (FIG. 5), the shelf number is set in either of the shelf numbers A and B that is vacant of the record of the medicine to be attached in the medicine master file (FIG. 2). In the case of the exchanging states of the medicine containers, both of the detaching and attaching process are carried out. Then, the same processes are repeated from the determination of the detection of "presence" of medicine container in step S31. In the case of the example of the detached state of FIG. 6, the shelf number "01" set in the shelf number A of the record of the tablet A is erased. In the case of the example of the attached state of FIG. 6, the shelf number "32" is set to the shelf number A of the record of the tablet G. In the case of the example of exchanging (detaching and attaching) states of FIG. 6, the shelf number "05" set as the shelf number A in the record of the capsule F is erased, and the shelf number "05" is set as the shelf number A in the record of the capsule I.

In contrast, if the "absence" of a medicine container is not detected, a determination is made as to whether or not the "cancel" button on the "medicine container attaching/detaching" screen (FIG. 5) has been clicked by the operator through the mouse (step S37). If the "cancel" button has been clicked, the sequence returns to the above-mentioned medicine packing process (FIG. 3), and if the button is not clicked, the sequence returns to step S31, thereby repeating the above-mentioned processes.

As clearly explained above, the present invention provides an arrangement in which, upon attaching and detaching a medicine container to and from each of shelves, the relationship between the kind of a medicine and the shelf number of the medicine can be stored or erased so that it is possible to attach, detach and exchange medicine containers even during a packing operation. Therefore, even when the kinds of the medicines become more than the number of shelf sections, it is possible to automatically carry out a packing operation while exchanging medicine containers during the packing operation.

Although the present invention has been fully described by way of the examples with reference to the accompanying drawing, it is to be noted that various changes and modifications will be apparent to those skilled in the art. Therefore, unless such changes and modifications otherwise depart from the spirit and scope of the present invention, they should be construed as being included therein.

What is claimed is:

1. A medicine packing apparatus comprising a plurality of medicine containers housing medicines classified into respective kinds, a feed unit having a plurality of shelf sections on which the plurality of medicine containers are detachably attached, the feed unit being operable to supply the medicine corresponding to a prescription data from the plurality of medicine containers, and a packing unit for packing the medicine supplied from the feed unit, said medicine packing apparatus further comprising:

storing means storing shelf numbers of said respective shelf sections and the respective kinds of medicines housed in said medicine containers attached on the shelf section;

a medicine identifying information reading means reading medicine identifying information of a medicine container on one of said shelf sections;

a display comprising a screen having a display portion displaying shelf number, detached medicine and attached medicine; and control means allowing said medicine identifying information reading means to read the medicine identifying information of the medicine container, allowing said display means to display the shelf number and the attached medicine and allowing said storing means to store the corresponding relationship between the kind of a medicine housed in said medicine container and the shelf number upon attaching said medicine container to said shelf sections, and allowing said display means to display the shelf number and the detached medicine and allowing said storage means to erase said corresponding relationship from said storage means upon detaching said medicine container from said shelf sections.

2. The medicine packing apparatus according to claim 1, wherein said display means is operable to display shelf numbers of the shelf sections to which medicine containers containing medicines included in prescription data are attached and shelf numbers of the shelf sections to which the other medicine containers that contain no medicines included in the prescription data are attached.

3. The medicine packing apparatus according to claim 1, further comprising:

a medicine container detecting means detecting the presence or absence of a medicine container on the shelf section, wherein said control means allows said display means to display the shelf number of the shelf section to which said medicine container is attached or the shelf number of the shelf section from which said medicine container is detached, based upon a detection signal from said medicine container detecting means.

4. The medicine packing apparatus according to claim 1, wherein said control means allows said display means to display the medicine and the shelf number of the corresponding shelf section, based upon a detection signal from said medicine identifying information reading means.

5. The medicine packing apparatus according to claim 2, further comprising:

a medicine container detecting means detecting the presence or absence of a medicine container on the shelf section, wherein, if said medicine container is attached to the shelf section, said control means allows said display means to display the shelf number of the shelf section to which said medicine container is attached based upon a detection signal from said medicine container detecting means, and wherein, if said medicine container is detached from the shelf section, said control means allows said display means to display the shelf number of the shelf section from which the medicine container is detached based upon a detection signal from said medicine container.

6. The medicine packing apparatus according to claim 2, wherein said control means allows said display means to display the medicine and the shelf number of the corresponding shelf section, based upon a detection signal from said medicine identifying information reading means.

7. The medicine packing apparatus according to claim 3, wherein said control means allows said display means to display the medicine and the shelf number of the corresponding shelf section, based upon a detection signal from said medicine identifying information reading means.

8. The medicine packing apparatus according to claim 1, wherein the medicine containers are adapted to house tablets or capsules to be supplied to the packaging unit in accordance with the prescription data.

9. A medicine packing apparatus comprising a plurality of medicine containers housing medicines classified into respective kinds, a feed unit having a plurality of shelf sections on which the plurality of medicine containers are detachably attached, the feed unit being operable to supply the medicine corresponding to a prescription data from the plurality of medicine containers, and a packing unit for packing the medicine supplied from the feed unit, said medicine packing apparatus comprising:

a storing unit storing shelf numbers of said respective shelf sections and the respective kinds of medicines housed in said medicine containers attached in the shelf section;

a medicine identifying information reading unit reading medicine identifying information of a medicine container on one of said shelf sections;

a display unit displaying a medicine container attaching/detaching screen comprising a frame of "shelf number/detached medicine/attached medicine";

a control unit allowing said medicine identifying information reading unit to read the medicine identifying information of the medicine container, allowing said display unit to display the shelf number and the attached medicine and allowing said storage unit to store the corresponding relationship between the kind of a medicine housed in said medicine container and the shelf number upon attaching said medicine container to said shelf sections, and allowing said display unit to display the shelf number and the detached medicine and allowing said storage unit to erase said corresponding relationship from said storage unit upon detaching said medicine container from said shelf sections.

10. The medicine packing apparatus according to claim 9, further comprising:

a medicine container detecting unit detecting the presence or absence of a medicine container on each of the shelf sections;

wherein said display unit comprises a first frame of "shelf number" displaying whether or not medicine containers are attached on the shelf sections, and a second frame of "medicine" displaying medicines that can be attached on the shelf sections; and wherein said control unit allowing the display unit to display the medicine container mounting state of each of the shelf sections on the first frame of "shelf number" and display the medicines that are attachable to the shelf sections but are not present attached to one of the shelf sections in the second frame of "medicine" based upon a detection signal from said medicine container detecting unit and the shelf numbers and kinds of medicines stored in said storing unit.

11. The medicine packing apparatus according to claim 9, wherein said display unit comprises a first frame of "shelf number" displaying whether the medicine containers that are attached on the shelf sections are detachable or not, and a second frame of "medicine" displaying medicines that are included in the prescription data and must be attached on the shelf sections; and wherein said control unit allows the display unit to display, in the first frame of "shelf number", the medicines that can be detached from the shelf sections and the medicine that is included in a prescription data and is not detachable from the shelf sections and to display, in the second frame of "medicine", the medicine that is included in the prescription data and must be attached on the shelf sections based upon the shelf numbers and the kinds of medicines stored in said storing unit.

12. A medicine packing apparatus comprising a plurality of medicine containers housing medicines classified into respective kinds, a feed unit having a plurality of shelf sections on which the plurality of medicine containers are detachably attached, the feed unit being operable to supply the medicine corresponding to a prescription data from the plurality of medicine containers, and a packing unit for packing the medicine supplied from the feed unit, said medicine packing apparatus comprising:

a storing unit storing medicine data which includes shelf numbers of the shelf sections and the kinds of medicines housed in the medicine containers that are attached in the shelf sections, respectively;

a medicine container detecting unit detecting the presence or absence of a medicine container on each of the shelf sections;

a display unit displaying a medicine container attaching/detaching screen that includes a first frame of "shelf number" for displaying whether or not medicine containers are attached on the shelf sections, and a second frame of "medicine" for displaying medicines that can be attached on the shelf sections; and a control unit allowing the display unit to display the medicine container mounting state of each of the shelf section in the first frame of "shelf number" and display the medicines that are attachable to the shelf sections but are not presently attached to one of the shelf sections in the second frame of "medicine" based upon a detection signal from said medicine container detecting unit and the medicine data stored in the storing unit.

13. A medicine packing apparatus comprising a plurality of medicine containers housing medicines classified into respective kinds, a feed unit having a plurality of shelf sections on which the plurality of medicine containers are detachably attached, the feed unit being operable to supply the medicine corresponding to a prescription data from the plurality of medicine containers, and a packing unit for packing the medicine supplied from the feed unit, said medicine packing apparatus comprising:

a storing unit storing medicine data which includes shelf numbers of the shelf sections and the kinds of medicines housed in the medicine containers that are attached in the shelf sections, respectively;

a display unit displaying a medicine container attaching/detaching screen which includes a first frame of "shelf number" for displaying whether the medicine containers that are attached on the shelf sections are detachable or not, and a second frame of "medicine" for displaying medicines that are included in the prescription data and must be attached on the shelf sections; and a control unit allowing the display unit to display, in the first frame of "shelf number", the medicines that can be detached from the shelf sections and the medicine that is included in the prescription data and is not detachable from the shelf sections and to display, in the second frame of "medicine", the medicine that is included in the prescription data and must be attached on the shelf sections based upon the medicine data stored in the storing unit.

* * * * *